March 17, 1942.  E. B. TOLMAN, JR  2,276,805
APPARATUS FOR CLEANING FILTER SURFACES OF PNEUMATIC CONVEYER APPARATUS
Filed June 22, 1940  3 Sheets-Sheet 2

Inventor:
Edgar B. Tolman Jr.
By Chritton, Wiles, Davies, Hirschl & Dawson
Attorneys.

Patented Mar. 17, 1942

2,276,805

UNITED STATES PATENT OFFICE 2,276,805

APPARATUS FOR CLEANING FILTER SURFACES OF PNEUMATIC CONVEYER APPARATUS

Edgar B. Tolman, Jr., Chicago, Ill.

Application June 22, 1940, Serial No. 341,934

4 Claims. (Cl. 183—57)

My invention relates to pneumatic conveyer systems for relatively fine solid material, such as for example ash from pulverized fuel furnaces, and involving as elements thereof means for separating the conveyed fine material from the gaseous conveyer fluid such, as for example, air, to avoid the discharge of the material with the fluid from the apparatus—in the use of air as the conveying medium, to the atmosphere.

In systems of this kind it is common to provide receiver-separators, as for example of the centrifugal type, through which the fluid laden with the fine material discharges, to effect the main separation of the material from the fluid, and so-called filtering means through which the fluid, laden with the dust portion of the material not removed in the separator-receiver, passes for still further cleaning of the fluid and rendering it dischargeable to the atmosphere without harmful effects; the filtering means for this purpose commonly being of the porous bag type involving, in the fluid-cleaning operation, the intercepting of the dust by the walls of the bags thereof forming the filtering medium and the travel of the fluid, from which the dust is removed, through the bags in a given direction for discharge to the atmosphere.

Such systems also involve suction means which operate to cause continuous flow of the conveyer fluid from the point at which the fluid entrains the fine material to and through the receiver-separator and the filtering means to the point at which the fluid, freed of the fine material, discharges to the atmosphere.

As will be understood, the filtering means, in the continued operation of such a system, become clogged by the fine material lodged on its filtering surface requiring frequent removal of this material from the filtering surface. Thus, in the case of filters of the bag type as systems have hitherto been provided, the removal of the deposits on the bags in accordance with common practice is accomplished by cutting the filtering means out of the fluid-course and shaking the bags presenting objections certain of which are the requirement, for satisfactory commercial installations, that two such filtering means be provided for alternate use, one remaining idle while the other is performing the filtering function; the necessity of providing bag-shaking equipment, the incident wear on the shaking equipment; and the hard usage to which the bags are subjected in the shaking operation, which will be manifest, must be relatively vigorous.

Certain of the objects of my invention are to provide a novel means for cleaning the filter surfaces, such as for example the filter bags, which will eliminate the necessity for the shaking operation referred to; to effect the cleaning operation quickly, positively and effectively; to reduce the cost of the equipment; and other objects as will be manifest from the following description.

Referring to the accompanying drawings:

Figure 1a is a fragmentary view of a modification of a portion of the apparatus shown in Fig. 1.

Figure 1:
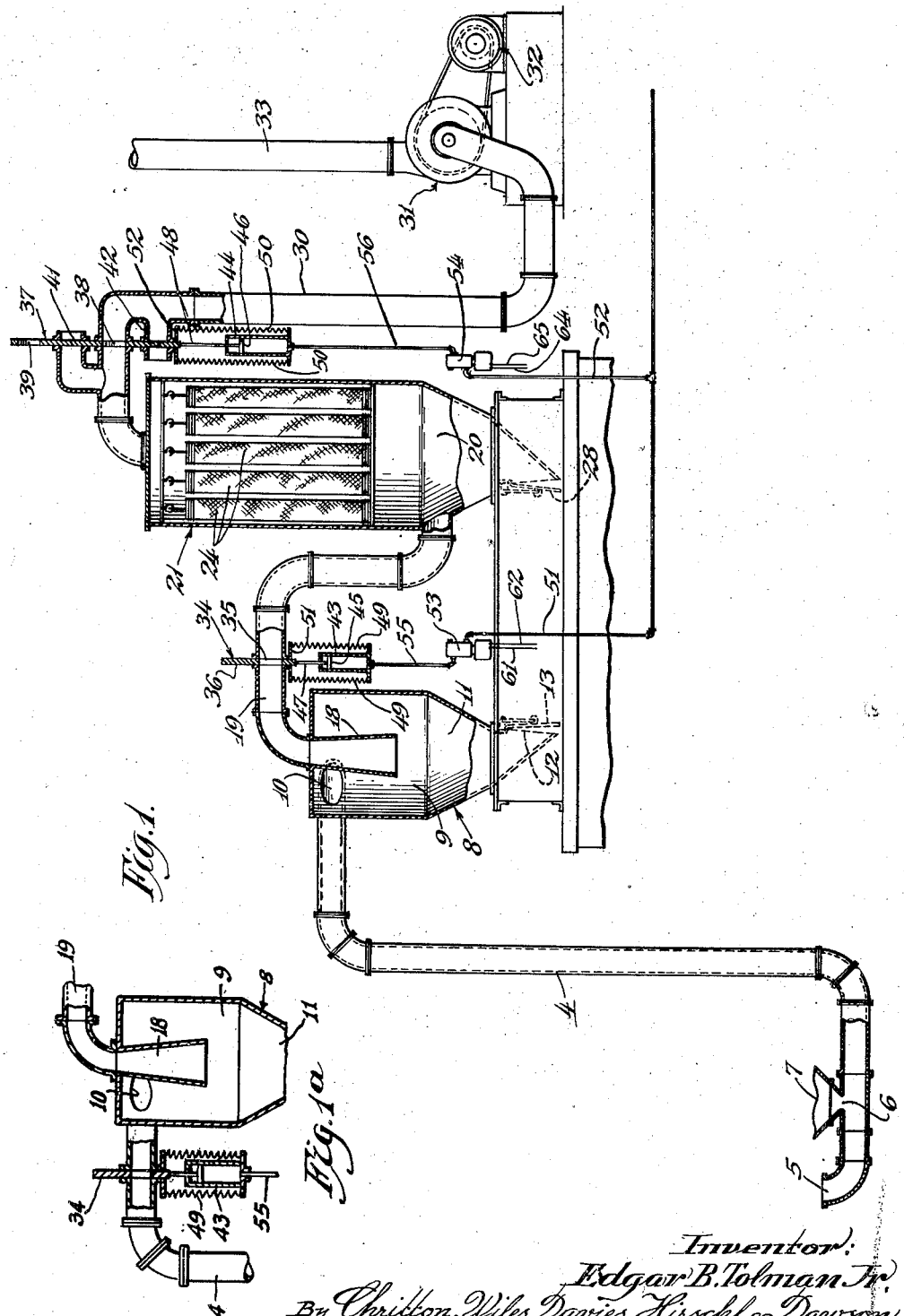
Figure 1 is a view in side elevation, with certain parts sectioned, of a pneumatic conveyer system constituting an embodiment of my invention and of a construction suitable for practicing my novel method.
Figure 2:
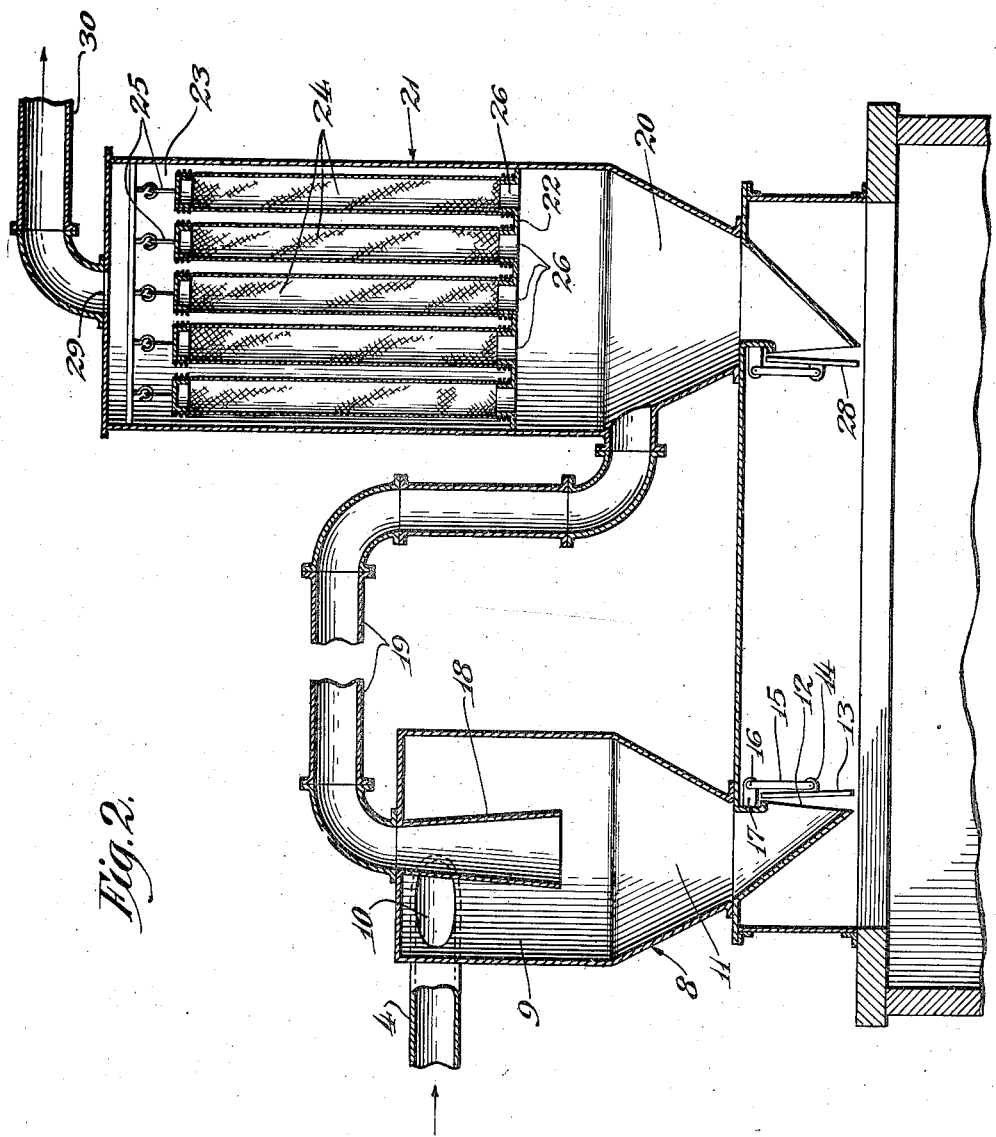
Figure 2 is a view in sectional elevation of the receiver-separator and the filter of the apparatus.

Referring to the particular illustrated apparatus the general features of which are of known construction, it comprises a pipe-line 4 open at 5 to the source of gaseous fluid which is to constitute the conveying medium such as for example to the atmosphere, and in communication, at an inlet 6, with the source of material to be conveyed, as for example ash from a furnace, discharged into a hopper, shown at 7.

The pipe-line 4 opens at its discharge end into a receiver-separator 8 of any suitable construction as for example of the well known centrifugal type shown, comprising a chamber 9 into the upper end of which the pipe 4 opens tangentially, as represented at 10, and a hopper-like lower portion 11 having a lateral discharge opening 12 controlled by a swinging gate 13 and through which the solid material collected in the receiver-separator 8 discharges for disposal, the gate 13 being shown as hingedly connected substantially mid-way between its upper and lower edges as represented at 14 on the lower end of a link member 15 hingedly connected at 16 to a stud 17 on the receiver-separator 8 and held closed by the suction produced in the operation of the conveyor apparatus.

The receiver-separator 8 also comprises a centrally disposed outlet pipe 18 depending from the top of the chamber 9 and communicating with a pipe line 19 which opens into the lower dust-collecting-portion 20 of a filter apparatus 21.

The filter apparatus 21 shown as of known construction, comprises a chamber divided by a horizontal partition 22 into an upper compartment 23 and the lower dust-collecting compartment 20.

The upper compartment 23 contains filtering elements forming a filtering medium, shown as in the form of vertically disposed bags 24 of interstitial material, as for example cloth, which are supported at their upper, closed ends by hangers 25 and communicate at their lower open ends with openings 26 in the partition 22 to which the bags 24 are connected in any suitable way; it being understood that the conveying fluid laden with the fine solid material to be removed therefrom in the filter, passes upwardly from the compartment 20 through the openings 26 in the partition 22 and thence into the bags 24 from which the fluid passes through the side walls of the bags into the upper compartment 23 for discharge, as hereinafter described, the solid material in the fluid thus being intercepted by the bags.

The lower part of the compartment 20 is of hopper shape as shown and has a lateral discharge opening 27 controlled by a swinging gate 28 supported as explained of the gate 15, through which the solid material discharges to disposal.

The compartment 23 has an upper outlet 29 communicating with a pipe-line 30 which leads to the inlet of a suction-producing device 31 of any suitable construction; that shown being of the positive displacement type driven by a power device 32 and having a pipe 33 leading from its outlet to the point at which it is desired the cleaned fluid discharge to the atmosphere.

The suction-producing device 31 operates to produce flow of the conveying fluid from the atmosphere into the open end 5 of the pipe line 4, past the solid-material inlet 6, entraining this material in the flowing fluid and conveying the entrained material to the receiver-separator 8 wherein the heavier, larger particles of the solid material are removed from the fluid and gravitate to the bottom of the receiver-separator. The fluid with the finer or dust portions of the solid material therein then flows through the pipe line 19 to the filter device 21 wherein these finer particles are intercepted, the fluid freed of the solid matrial thence flowing through the pipe-line 30 to the suction-producing device 31 from which it discharges, in the desired clean condition, through the pipe 33 to the atmosphere.

In accordance with my invention I provide for the removal of the dust from the inner surfaces of the bags 24, upon which it becomes deposited in the filtering operation, by suddenly breaking the vacuum in the conveyer course at the clean side of the bags, thereby producing a sudden rush of air through the bags in the direction opposite to its flow in the normal operation of the apparatus and dislodging the dust collected on the bags in the filtering operation which gravitates into the compartment 20 for disposal.

The particular means shown for this purpose, but which are shown only by way of example of suitable means for this purpose, comprise a valve 34 for closing the conveyer course at the dusty side of the filter apparatus 21, this valve, by way of example, being located either in the position shown in Fig. 1, viz., between the filter apparatus 21 and the receiver-separator 8 or in the position shown in Fig. 1a, viz., between the receiver-separator 8 and the inlet 5, the valve 34 being shown as in the form of a slide plate having an aperture 35 therein for registration in one position with the passage through the pipe in which it is installed and a solid portion 36 for registration with such passage, when shifted downwardly to another position.

These means also comprise a valve 37, shown as in the form of a slide plate, having spaced apart openings 38 and 39 therein for registration alternately with the passage in the pipe 30 and the passage in a branch-pipe 40 communicating at one end with the pipe 30 between the valve 37 and the filter apparatus 21 and open at its other end to the atmosphere, the openings 38 and 39 being so spaced apart that when the valve 37 is in a position in which the pipe 30 is open, the branch pipe 40 is closed by the solid portion 41 of the valve, and when the valve is in a position in which the pipe 30 is closed by the solid portion 41 the branch pipe 40 is open.

As it is desired that the suction device 31 run continuously and to permit of the use of any type of such device the pipe 30 is preferably provided with a second branch pipe 42 open to the atmosphere between the point of cut-off of the pipe 30 by the valve 37 and the suction device 31, and the valve is so disposed that when it is shifted to a position in which the pipe 30 is closed its opening 38 will register with the passage in the branch-pipe 42 and thus open the suction inlet of the device 31 to the atmosphere. However, the branch-pipe 42 with its controlling means, as described may be omitted, if desired, when the type of suction device used does not require communication of its inlet with the atmosphere when shut off from the conveyer course, as in the case of a centrifugal blower.

Any suitable means for operating the valves 34 and 37 may be provided. The particular means shown for this purpose comprise stationary cylinders 43 and 44 containing pistons 45 and 46, respectively, connected at their stems 47 and 48 with the valves 34 and 37, respectively, and springs 49 and 50 connected with cross bars 51 and 52 fixed to the valves 34 and 37 and to the cylinders 43 and 44, which operate to urge the valves 34 and 37 downwardly. The mechanisms thus provided are fluid-pressure-operated, fluid pressure introduced into the bottoms of the cylinders 43 and 44 serving to force the valves 34 and 37 to uppermost positions against the resistance of the springs 49 and 50, and discontinuing fluid pressure to these cylinders and permitting of the venting of the fluid pressure therefrom, permitting the springs to move the valves to lowermost position.

In the particular arrangement shown fluid pressure for lifting the valves 34 and 37 is supplied, from any suitable source thereof (not shown), through pipes 51 and 52 to solenoid-actuated valve mechanisms 53 and 54 such, as for example, as are commonly known in the art, wherein the valves proper (not shown), when operated by energizing the solenoids thereof (not shown), open the bottoms of the cylinders 43 and 44 to the pipes 51 and 52; through pipes 55 and 56, and close vents 57 and 58 from the valve casings to the atmosphere. Upon de-energizing the solenoids the solenoid-actuated valves lower in response to the action of internal springs (not shown), closing the pipes 55 and 56 to the pipes 51 and 52 and opening the vents 57 and 58 to the atmosphere which permit the fluid pressure in the cylinders 43 and 44 beneath the pistons 45 and 46 to be forced from the cylinders by the force of the springs 49 and 50.

It is desirable that the operation of the valves 34 and 37 be effected in accordance with certain predetermined cycles of operation and, for the reasons hereinafter explained, that the valve 34 be caused to close the conveyer course at the dusty side of the filter apparatus before the valve 37 closes.

In accordance therewith, and by way of example, the valves 34 and 37 are operated electrically. To this end I provide a pair of electric switches 59 and 60 controlling, respectively, the solenoids referred to, the switch 59 being interposed in the leads 61 and 62 from a source of electric current represented at 63 to the solenoid of the operating mechanism for valve 34 and the switch 60 interposed in the branch wires 64 and 65 leading from the wires 61 and 62 to the solenoid of the operating mechanism for valve 37.

Figure 3:
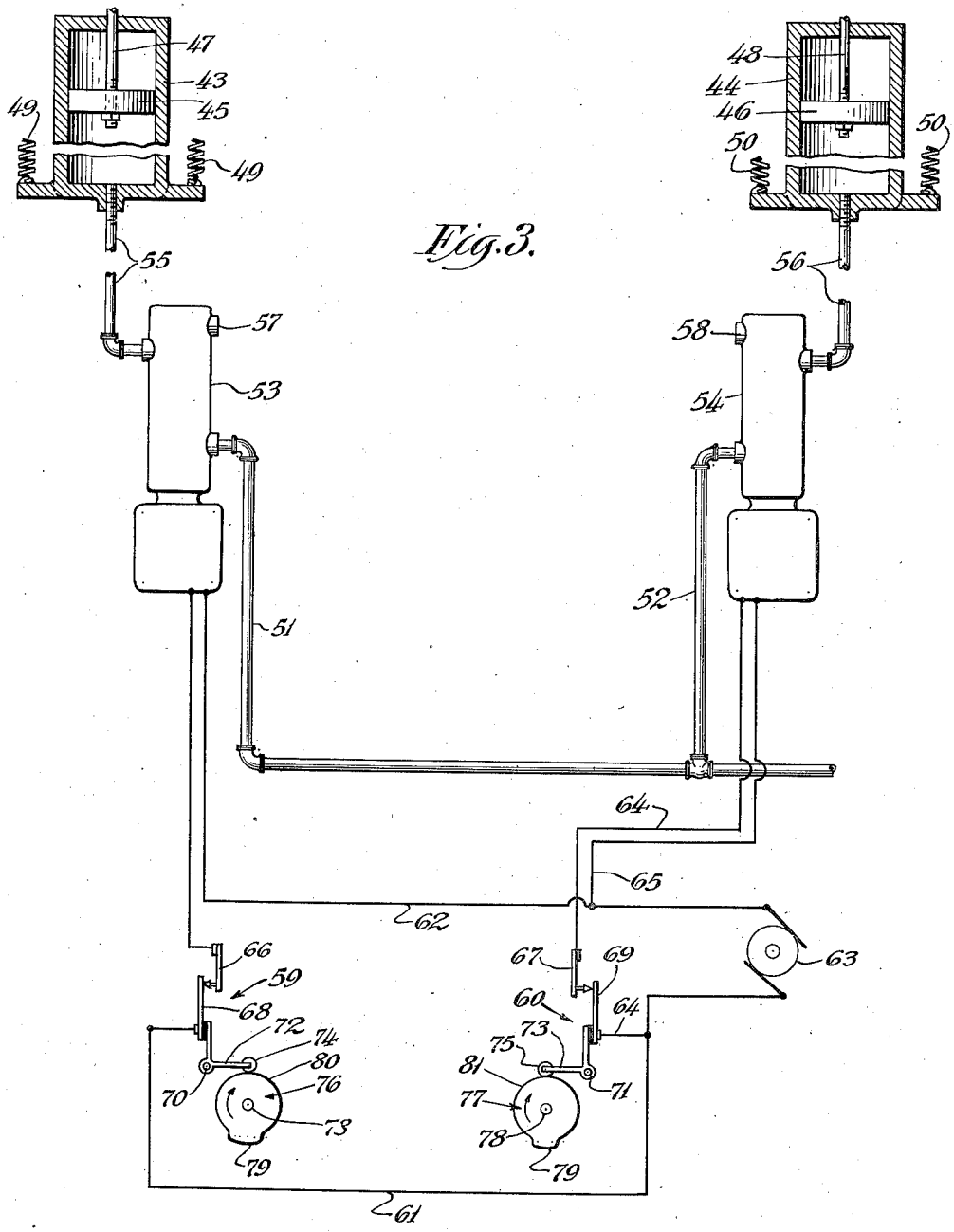
Figure 3, a view in side elevation, partly sectional, and in the nature of a diagram, of means for controlling the exertion of the suction in the apparatus and the breaking of the vacuum produced thereby.

The switches 59 and 60 comprise stationary contacts 66 and 67 and movable contacts 68 and 69 fulcrumed at 70 and 71 on stationary parts of the structure and provided with arm extensions 72 and 73 carrying rollers 74 and 75, the movable contacts normally bearing against their cooperating stationary contacts. The movable contacts 72 and 73 cooperate with cam disks 76 and 77, respectively, mounted on a single shaft (shown at 78 in the diagrammatic showing in Fig. 3). The cam disks 76 and 77 present peripheral cam projections 78 and 79 and depressed circular segments 80 and 81, the cam projections operating upon engaging the respective movable contacts 72 and 73 to open the switches.

As will be understood the switches 59 and 60 are in closed position during the engagement of the segment portions 80 and 81 with the movable contacts 72 and 73, but are opened by the riding of the cam projections 78 and 79 against them.

During the closed position of the switches 59 and 60 the valves 34 and 37 are in the positions shown in the drawings in which the suction producing means 31 are in communication with the entire conveyer course and the branch pipes 40 and 42 are closed to the atmosphere. When the switches 59 and 60 open, the valves 34 and 37 lower to a position in which the conveyer course is closed between the valves 34 and 37 and the branch pipes 40 and 42 are open to the atmosphere.

As will be understood, suction for entraining the material to be conveyed is maintained throughout the conveyer course for a predetermined length of time, determined by the cam mechanism and its drive, say for about two minutes, whereupon, by the engagement of the cam projections 78 and 79 with the switches 59 and 60, the valves 34 and 37 are raised to close the conveyer course between these valves and open the branch pipes 40 and 42 to the atmosphere, the opening of the branch pipe 40 to the atmosphere breaking the vacuum in the filter apparatus, resulting in a rush of air through the bags 24 which displaces the dust deposited thereon in the filtering operation, the dust dropping into the hoppers 29 and discharging therefrom past the gate 28 which opens permitting such discharge.

Following the filter cleaning operation which requires a comparatively short time say about ten seconds, the cam projections 78 and 79 disengage from the switches 59 and 60 which close and effect the return of the valves 34 and 37 to the normal position for re-establishing the conveying operation.

It is preferred that the production of a strong reversal of air for cleaning the bags be provided for and this I accomplish by building up a high vacuum on the dusty side of the filter bags, by closing the dusty side of the conveyer course before interrupting communication between the suction-producing means and the filter apparatus and opening the clean side of the filter to the atmosphere through the branch pipe 40. This is provided for in the particular apparatus shown by so setting the cam projection 78 that it engages its cooperating switch 59 a few seconds before the cam projection 79 engages its cooperating switch.

While I have illustrated and described a particular apparatus for, and a particular way of, practicing my novel method, I do not wish to be understood as intending to limit the invention thereto as the method may be practiced by the use of other apparatus and in other ways without departing from the spirit of the invention. Furthermore, while I have illustrated and described my invention as embodied in a particular form of apparatus I do not wish to be understood as intending to limit it thereto as the same may be variously modified and altered and the invention embodied in other forms of structure without departing from the spirit of the invention.

What I claim as new and desire to secure by Letters Patent, is:

1. In a pneumatic conveyer system having a conveyer and filter course communicating with the source of solid material to be conveyed and including filtering means, and suction-producing means for creating a flow of conveyer fluid in one direction in said course for conveying therein the solid material; means for closing said course at the dusty side of said filtering means, and means for relieving the vacuum produced in said filtering means by said suction-producing means to create a flow of fluid in the opposite direction through the filtering medium of said filtering means for effecting the removal from the filtering medium of material deposited thereon.

2. In a pneumatic conveyer system having a conveyer and filter course communicating with the source of solid material to be conveyed and including filtering means, and suction producing means for creating a flow of conveyer fluid in one direction in said course for conveying therein the solid material; means for closing said course at the dusty side of said filtering means, means for discontinuing the suction action through the filtering medium of said filtering means and means for relieving the vacuum produced in said filtering means by said suction-producing means to create a flow of fluid in the opposite direction through the filtering medium, for effecting the removal from said medium of material deposited thereon.

3. In a pneumatic conveyer system having a conveyer and filter course communicating with the source of solid material to be conveyed and including a receiver and separator and a filter, and suction-producing means for creating a flow of conveyer-fluid in one direction in said course; means to close said course between the receiver and filter, means for closing said course between said filter and said suction-producing means, and means for opening the clean side of said filter to the atmosphere.

4. In a pneumatic conveyer system having a conveyer and filter course communicating with the source of solid material to be conveyed and including filtering means, and suction-producing means for creating a flow of conveyer fluid in one direction in said course for conveying therein the solid material; means for closing said course at the dusty side of said filtering means, means for relieving the vacuum produced in said filtering means by said suction-producing means to create a flow of fluid in the opposite direction through the filtering medium of said filtering means for effecting the removal from the filtering medium of material deposited thereon, and means operating automatically, when actuated, to cause the course-closing means at the dusty side of said filtering means to close said course before said vacuum-relieving means operate.

EDGAR B. TOLMAN, Jr.

CERTIFICATE OF CORRECTION.

Patent No. 2,276,805.   March 17, 1942.

EDGAR B. TOLMAN, JR.

It is hereby certified that error appears in the printed specification of the above numbered patent requiring correction as follows: Page 3, second column, lines 30 and 31, 44 and 45, 60 and 61, 71 and 72, claims 1, 2, 3 and 4 respectively, for "conveyer system having a conveyer and filter course" read --conveyer and filter system having a conveyer course--; and that the said Letters Patent should be read with this correction therein that the same may conform to the record of the case in the Patent Office.

Signed and sealed this 26th day of May, A. D. 1942.

(Seal)

Henry Van Arsdale,
Acting Commissioner of Patents.